United States Patent Office 2,744,890
Patented May 8, 1956

2,744,890

PROTEINACEOUS COMPOSITION AND METHOD OF MAKING THE SAME

Jean I. Wagner, Huntington, Becker Habighurst, Patchogue, and Millard G. Terry, Jr., Holtsville, N. Y., assignors to National Dairy Research Laboratories, Inc., Oakdale, N. Y., a corporation of Delaware No Drawing. Application December 19, 1952, Serial No. 327,034

5 Claims. (Cl. 260—119)

This invention relates to a proteinaceous composition adapted for use with a coagulating bandage and to a method for preparing this composition.

In U. S. Patent No. 2,579,367, dated December 18, 1951, to Raymond M. Curtis, John H. Brewer, and Arthur E. Stickels, there is disclosed a proteinaceous solution or paste useful in treating burns or similar pathological conditions to cover the damaged area and thus stop or retard the flow of plasma from the area and to protect it against pyrogenic organisms. The solution or paste is coated over the area to be treated, and then the protein coagulant is applied, preferably incorporated in a coagulating bandage, to precipitate the protein and convert the protein into a soluble semi-permeable eschar. The proteinaceous paste contains casein or like alkali-soluble heavy metal salt-coagulable protein, a wetting agent, such as sodium lactate, sodium hydroxide and water. The composition is sterilized before use by heating for 20 minutes at about 250° F. (120° C.).

Several problems are presented in compounding a formula which will be satisfactory under all conditions. The compositoin must initially have a viscosity which is not so thin that the composition will run off the wound area and will be absorbed by the bandage before it can be coagulated, and it must not be so thick that difficulties arise in spreading it over the area. Since the product is prepared from a denatured protein, the product is subject to age-thickening, so that in the course of time its viscosity increases to the point that the composition cannot be spread upon the wound and may even solidify or form a gelatinous mass whose body may "break," producing a "watered off" granular product.

In general, it may be stated that compositions having a viscosity in excess of 100 Brookfield units at 20 R. P. M. or more may cause a noticeable pulling during application to normal skin, and this viscosity should not ordinarily be exceeded in order to minimize pain during application to sensitive burned areas. The viscosity is measured at 25° C. using a standard Brookfield viscometer equipped with spindle No. 6, rotating at 20 R. P. M. The readings are taken on a 0 to 100 unit scale. Four fluid ounces of the material is tested in a cylindrical container (diameter 6.46±.09 cm.).

For the purposes of the instant invention the time required for a composition of the invention to reach a viscosity of 60 Brookfield units at 20 R. P. M. is defined as "useful shelf-life." It will be understood that products having a higher viscosity are also useful, but the viscosity of 60 units is employed herein as a gauge of the rate at which the product age-thickens.

In accordance with the invention, age-thickening of proteinaceous composiitons of the type described in U. S. Patent No. 2,579,367 is inhibited by addition thereto of a small amount of an organic or inorganic ammonia compound such as inorganic ammonium salts and organic amino (—NH₂)-imino (=NH), and amido- (—CONH₂— and —CONHR— where R is an organic radical) compounds. All of these can be generically termed ammonia compounds, and are referred to collectively hereinafter as the age-thickening inhibitor.

Illustrative compounds are urea, cysteine, methionine and hydrolyzed wool protein (botanein).

Any amount of the organic ammonia compound will assist in inhibiting age-thickening of the composition. It would usually be desirable, however, to use an amount sufficient to prevent the viscosity from reaching 60 Brookfield units at 20 R. P. M. within about thirty days, inasmuch as this is the normal time during which the product would be expected to be stored before sale. In order to achieve this, at least 0.25% inhibitor by weight of the composition should be used. Larger amounts than this, up to approximately 1%, give good results. As the amount of inhibitor increases the improvement in inhibition of age-thickening becomes less in proportion to the amount of inhibitor and when quantities in excess of 1% are used the viscosity is reduced to a point where the product ceases to be useful for the intended purpose, possibly because at amounts in excess of 1% a solubilization effect is obtained. Generally, more than the amount required to produce a shelf-life of approximately one year would not be necessary.

The resulting composition can be sterilized at about 248 to 250° F. for about 20 to 25 minutes and will have an improved shelf-life. When the time is increased from 20 to 25 minutes, the useful shelf-life of the composition may be extended by as much as 20%. When the sterilization time exceeds 25 minutes the composition may gelatinize and hydrolysis of protein may take place. It should be kept in mind that the longer the composiiton is held at high sterilization temperatures, the greater the danger that the protein will be further denatured.

Age-thickening also is inhibited by storage of the sterilized composition at low temperatures. A product stored at 110° F., for example, will have a shorter shelf-life than one stored at 70° F. Storage at refrigeration temperatures, i. e. of 40° F. or below, is even more effective in inhibiting age-thickening and extending shelf-life. It is the object of the invention however to produce a product which can be stored at normal room temperatures, i. e., at 110° F. or below. Although the composition in accordance with the invention can be subjected to storage temperatures in excess of 110° F., it is preferred to store it at temperatures of 110° F. or below, at which temperatures the shelf-life is considerably improved compared to a product which does not contain an age-thickening inhibitor of the type set forth. Even at the temperatures in excess of 110° F., however, the shelf-life of the composition of the invention is considerably greater than that of a composition which does not contain the age-thickening inhibitor of the invention.

Thus it will be seen that compositions can be prepared in accordance with the invention having any desired shelf-life depending upon the amount of age-thickening inhibitor and the sterilization conditions, and this shelf-life can be further extended by favorable storage conditions. The best results are obtained by the use of a relatively small proportion of inhibitor, preferably at least 0.25% by weight, and a sterilization time in excess of 20 minutes at 250° F. This composition should be stored at a temperature of 110° F. or below.

The remaining components of the composition of the invention and the proportions thereof which can be used are set forth in U. S. Patent No. 2,579,367, and accordingly it is not necessary to review this aspect of the invention in detail.

In general, it can be stated that the protein should be alkali-soluble i. e., it should be converted into a soluble alkali proteinate such as sodium or potassium caseinate. The composition will contain an alkali capable of reacting with the protein to produce an alkali-soluble protein. Sodium and potassium hydroxide are satisfactory, but other non-skin-irritating alkalis can be used. The amount of alkali will be sufficient to maintain the pH of the protein solution within the range from 6 to 8, and preferably approximating the pH of blood plasma.

The protein may be denatured to some extent in the course of heating the composition as in the course of sterilization and of the treatment with alkali. This denaturation does no harm since the eschar formed thereby is made softer and stronger. However, the protein must not be denatured to the extent that it is incapable of being coagulated by the divalent heavy metal salt such as the water-soluble salts of divalent zinc, manganese and cobalt, i. e. zinc acetate, cobalt sulfate and manganese sulfate.

The initial consistency of the paste can be varied as desired, but the paste should not be so fluid as to run off the wound and be absorbed by the bandage, and yet should of course be readily flowable. It will be appreciated that the caseins of commerce vary considerably in their physical properties and therefore it will be found desirable to adjust the amount of the casein used to provide a paste having an initial viscosity following sterilization approximating 20 to 25 units at 20 R. P. M.

The composition may also contain a wetting agent to facilitate the wetting of the area to be coated, and an antiseptic agent. Sodium lauryl sulfate is both a wetting agent and an antiseptic agent. Other wetting agents and/or antiseptic agents can be used.

A plasticizer may be incorporated to produce an artificial eschar which is plastic or elastic. Sodium lactate is an example.

The following examples illustrate the invention.

EXAMPLE 1

Water (24.773 kg.) was placed in a mixing tank and 6.75 kg. of casein slowly sifted in. The mixture was agitated for 15 minutes and heated. A 50% aqueous sodium lactate solution (2.9 kg.) was added slowly and then a solution of 900 grams of sodium lauryl sulfate (Duponol C) in 6 kg. of water and a solution of 157 grams sodium hydroxide in 500 grams of water were added with stirring. Heating was continued until the temperature had reached 150° F. This required 15 to 20 minutes. A solution of 102 grams of urea in 102 grams of water was added and mixing continued for 15 minutes while allowing the mixture to cool slowly. When the mixture had reached 110–120° F., it was filled into containers which were sterilized for 25 minutes at 250° F. The composition had a shelf-life of over 21 weeks.

EXAMPLE 2

Example 1 was repeated, substituting 0.2% of a 50–50 mixture of cysteine and methionine for the urea. The composition had a shelf-life of over 21 weeks.

EXAMPLE 3

Example 1 was repeated, substituting 0.058% hydrolyzed wool protein (botanein) for the urea. The composition had a shelf-life of over 21 weeks.

EXAMPLE 4

Water (380 lbs. 10 oz.) was charged into a 200 gallon stainless steel jacketed vat and brought to 130° F. Casein (111 lbs. 9 oz.) was added with stirring followed by 150 grams of D. C. Antifoam "A," 47 lbs. 4 oz. of a 50% aqueous sodium lactate solution, a solution of 14 lbs. 14 oz. sodium lauryl sulfate (Duponol C) in 124 lbs. of water, a solution of 2 lbs. 10 oz. sodium hydroxide in 10 lbs. of water and a solution of 790 grams urea in 6 lbs. water. Thereafter the mixture was mixed for 25 minutes at 130–140° F. The total processing time required was 30 minutes. The composition was filled in 4 oz. cans under a 27 inch vacuum using an Anderson filler, and the cans sterilized at 248° F.; some cans were sterilized for 20 minutes and some for 25 minutes. The two batches of cans then were divided into two lots, one lot of the 20 and 25 minute groups being stored at 110° F. and another lot of cans of each group being stored at 70° F.

The useful shelf-life of the product then was compared with a control prepared in exactly the same way but without urea. The following results were obtained:

Table

| Sample | Sterilization | | Storage Temp., ° F. | Useful Shelf-Life, Days |
|---|---|---|---|---|
| | Temp., ° F. | Time, min. | | |
| Control—no urea, Example 4 | 250 | 20 | 110 | 13. |
| | 250 | 20 | 110 | 30. |
| Do | 250 | 25 | 110 | 18. |
| | 250 | 25 | 110 | 35. |
| Do | 250 | 20 | 70 | 75. |
| | 250 | 20 | 70 | over 135.[1] |
| Do | 250 | 25 | 70 | 105. |
| | 250 | 25 | 70 | over 135.[2] |

[1] Slope of curve indicates (by extrapolation) a shelf-life of over 21 weeks.
[2] Slope of curve indicates (by extrapolation) a shelf-life of about 30 weeks.

The initial viscosity following sterilization of the compositions of Example 4 and of the control compositions was 21 Brookfield units at 20 R. P. M. The test measured the time required to reach a viscosity of 60 Brookfield units at 20 R. P. M. in accordance with the definition of useful shelf-life. Thus, it is evident that the compositions containing urea had a considerably longer shelf-life in each case. In fact, when stored at 70° F. the composition of Example 4 which had been sterilized for 25 minutes had an indicated shelf-life of about 30 weeks, as compared with 105 days for the control which did not contain urea. The improvement obtained by the age-thickening inhibitor of the invention thus is evident from this data.

The proteinaceous composition of the invention can be used as a dressing for burns, ulcers, wounds, bedsores, skin abrasions, skin grafts and similar pathological conditions in the manner set forth in U. S. Patent No. 2,579,367. The coagulation follows immediately and results in the formation of an artificial eschar which enhances the skin, does not become rigid and brittle upon drying, yet does not flow and does not deteriorate. The eschar can be removed without excessive damage to the injured area by wetting with water, whereupon it becomes quite soft and can readily be detached from the injured area. It does not damage or destroy tissue or interfere with the healing process while protecting the injured area and preventing loss of plasma protein.

All percentages in the specification and claims are by weight.

We claim:

1. A proteinaceous composition for use as a dressing comprising an aqueous solution having a viscosity within the range from 20 to 60 Brookfield units at 20 R. P. M. of an alkali-soluble non-antigenic heavy-metal-salt-coagulable casein and an ammonia compound capable of inhibiting age-thickening of the composition and selected from the group consisting of urea, cysteine, methinone and hydrolyzed wool protein, said compound being in an amount within the range from about 0.25% to 1% by weight of the composition.

2. A proteinaceous composition for use as a dressing comprising an aqueous solution having a viscosity within the range of 20 to 60 Brookfield units at 20 R. P. M. of an alkali-soluble non-antigenic heavy-metal-salt-coagulable casein and urea in an amount within the range from about 0.25% to 1% by weight of the composition.

3. A proteinaceous composition for use as a dressing comprising an aqueous solution having a viscosity within the range from 20 to 60 Brookfield units at 20 R. P. M. of an alkali-soluble non-antigenic heavy-metal-salt-coagulable casein and cysteine in an amount within the range from about 0.25% to 1% by weight of the composition.

4. A proteinaceous composition for use as a dressing comprising an aqueous solution having a viscosity within the range from 20 to 60 Brookfield units at 20 R. P. M. of an alkali-soluble non-antigenic heavy-metal-salt-coagulable casein and methionine in an amount within the range from about 0.25% to 1% by weight of the composition.

5. A proteinaceous composition for use as a dressing comprising an aqueous solution having a viscosity within the range from 20 to 60 Brookfield units at 20 R. P. M. of an alkali-soluble non-antigenic heavy-metal-salt-coagulable casein and hydrolyzed wool protein in an amount within the range from about 0.25% to 1% by weight of the composition.

References Cited in the file of this patent

UNITED STATES PATENTS

| Number | Name | Date |
|---|---|---|
| 840,931 | Goldsmith | Jan. 8, 1907 |
| 1,886,750 | Shisler | Nov. 8, 1932 |
| 1,971,522 | Dunham | Aug. 18, 1934 |
| 2,431,119 | Horvath | Nov. 19, 1947 |
| 2,579,367 | Curtis et al. | Dec. 18, 1951 |
| 2,584,123 | Gruenwald | Feb. 5, 1952 |

OTHER REFERENCES

Robinson: Am. J. Surg. (August 1936), pp. 192–197.